(12) United States Patent  (10) Patent No.: US 8,629,997 B2
Torii  (45) Date of Patent: Jan. 14, 2014

(54) PRINT CONTROL APPARATUS AND IMAGE FORMING SYSTEM FOR RENDERING IMAGE DATA

(71) Applicant: Fuji Xerox Co., Ltd., Tokyo (JP)

(72) Inventor: Takeshi Torii, Yokohama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/727,395

(22) Filed: Dec. 26, 2012

(65) Prior Publication Data

US 2013/0201505 A1  Aug. 8, 2013

(30) Foreign Application Priority Data

Feb. 2, 2012 (JP) ................................. 2012-020627

(51) Int. Cl.
*G06F 3/12* (2006.01)
*G06K 15/00* (2006.01)

(52) U.S. Cl.
USPC ........ 358/1.13; 358/1.15; 358/1.17; 358/1.18

(58) Field of Classification Search
None
See application file for complete search history.

(56) References Cited

U.S. PATENT DOCUMENTS

| | | | |
|---|---|---|---|
| 6,348,975 B1* | 2/2002 | Tsunekawa et al. | 358/1.17 |
| 2001/0019671 A1* | 9/2001 | Tokura | 399/82 |
| 2004/0061892 A1* | 4/2004 | Ferlitsch | 358/1.15 |
| 2009/0109471 A1 | 4/2009 | Yanazume et al. | |
| 2009/0153892 A1* | 6/2009 | Torii | 358/1.13 |
| 2010/0079805 A1 | 4/2010 | Hashimoto | |
| 2010/0165806 A1* | 7/2010 | Mikami et al. | 369/47.5 |
| 2012/0026520 A1 | 2/2012 | Torii | |
| 2013/0070271 A1* | 3/2013 | Torii | 358/1.13 |
| 2013/0194598 A1* | 8/2013 | Torii | 358/1.13 |

FOREIGN PATENT DOCUMENTS

| | | |
|---|---|---|
| JP | A-2008-015605 | 1/2008 |
| JP | A-2009-135872 | 6/2009 |
| JP | A-2009-146251 | 7/2009 |
| JP | A-2010-108470 | 5/2010 |
| JP | A-2011-051234 | 3/2011 |

OTHER PUBLICATIONS

May 31, 2012 Japanese Office Action issued in Application No. JP-A-2012-020627 (with translation).

* cited by examiner

*Primary Examiner* — Vincent Rudolph
(74) *Attorney, Agent, or Firm* — Oliff & Berridge, PLC

(57) ABSTRACT

A print control apparatus includes a rendering unit, a sending unit, a distribution unit, and a saving unit. The rendering unit performs rendering in response to a print instruction described in a page-dependent page description language where details of a change of a print resource on a certain page are applied to other pages. The sending unit sends the entire print instruction including pages to the rendering unit. The distribution unit distributes, to the rendering unit, a process request specifying which of the pages is to be rendered. The saving unit saves a process state of the rendering unit after rendering a preset page. When executing rendering by extracting the print instruction of the page specified by the distributed process request to image data, if the process request is distributed in descending order, the rendering unit resumes the process state saved in the saving unit, and renders the specified page.

14 Claims, 13 Drawing Sheets

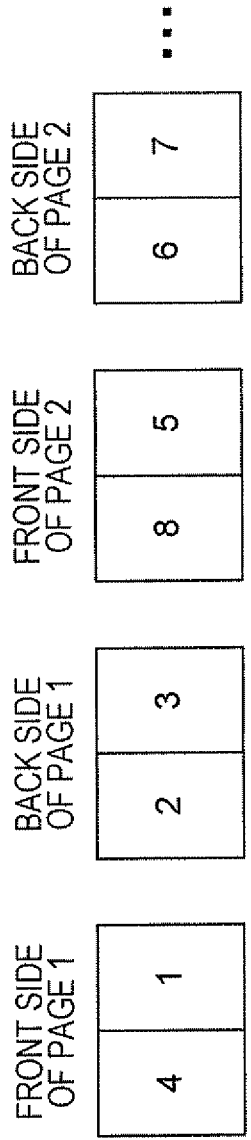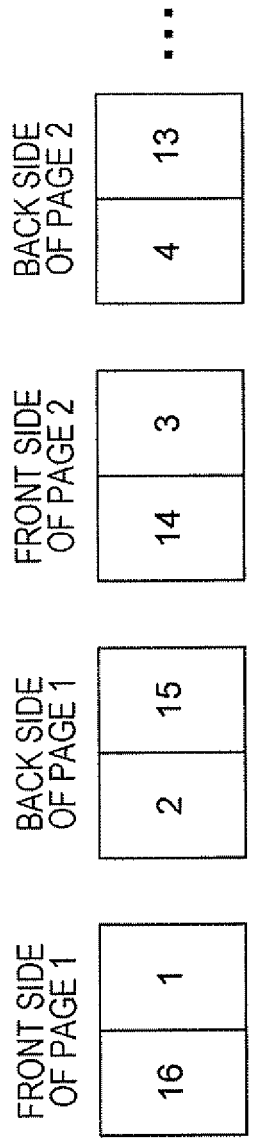

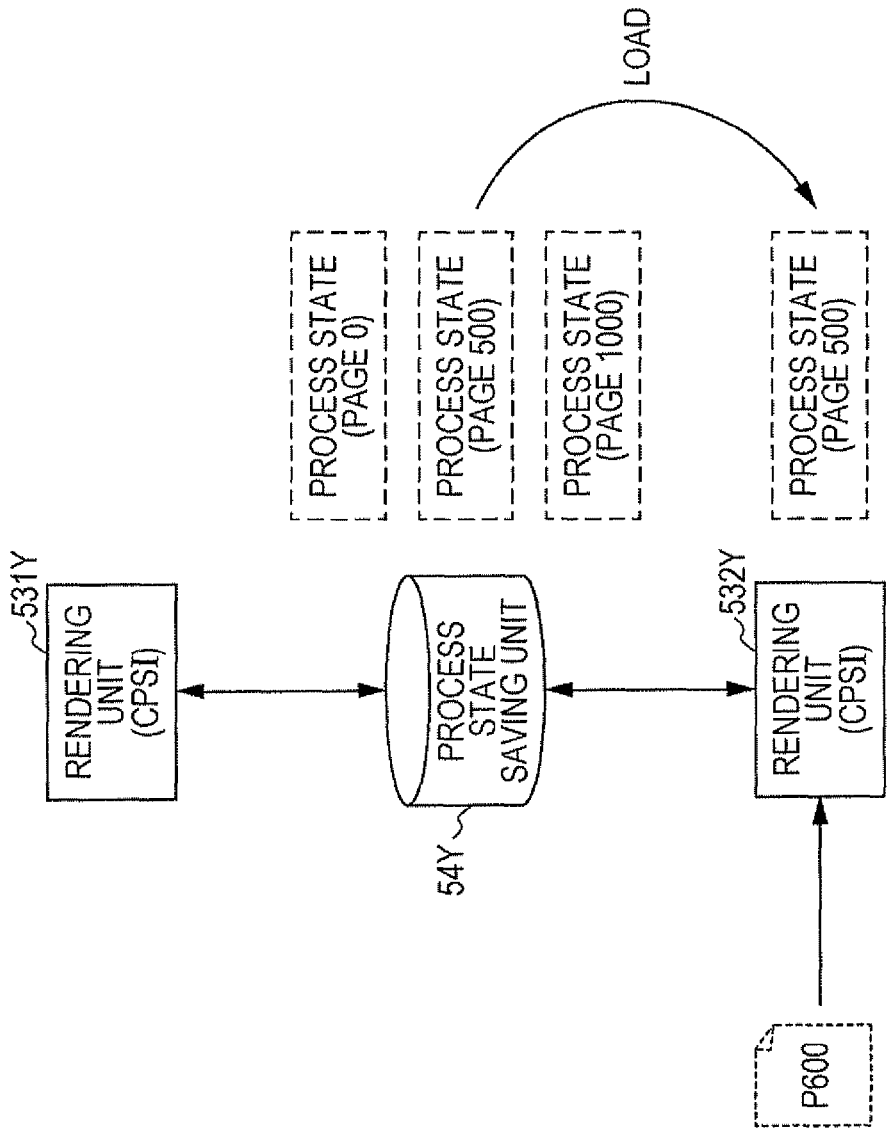

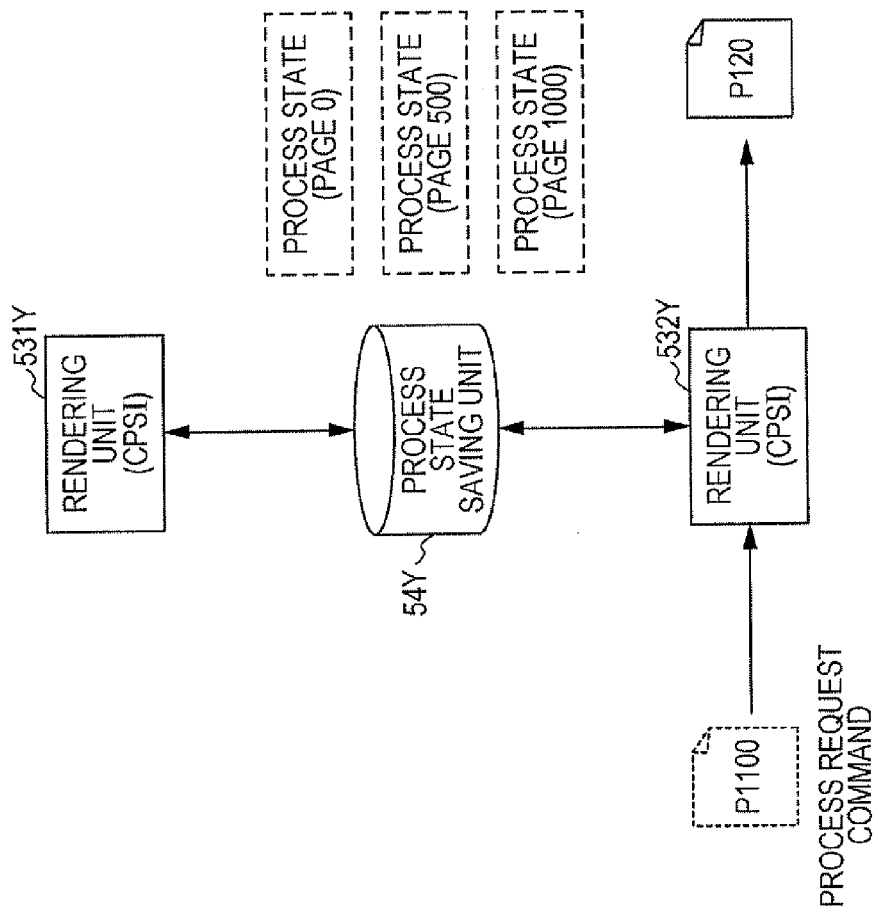

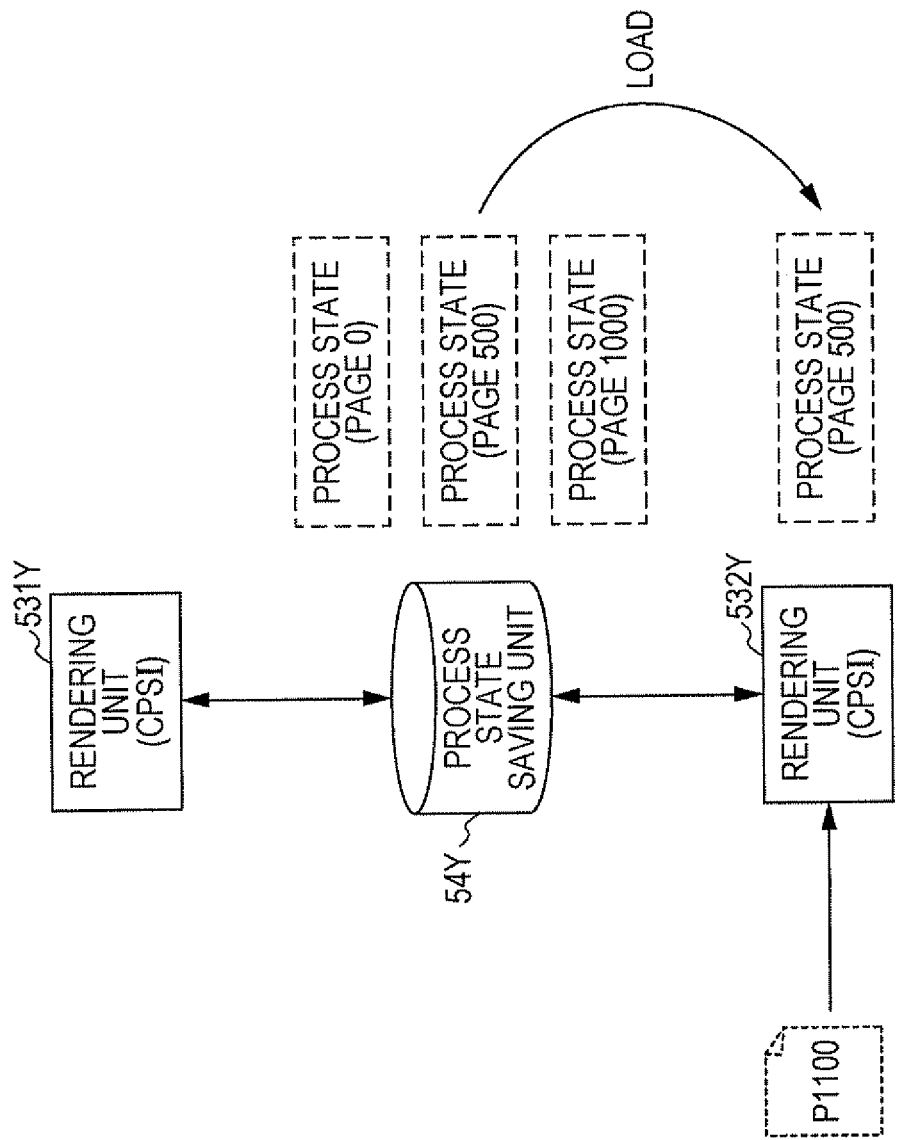

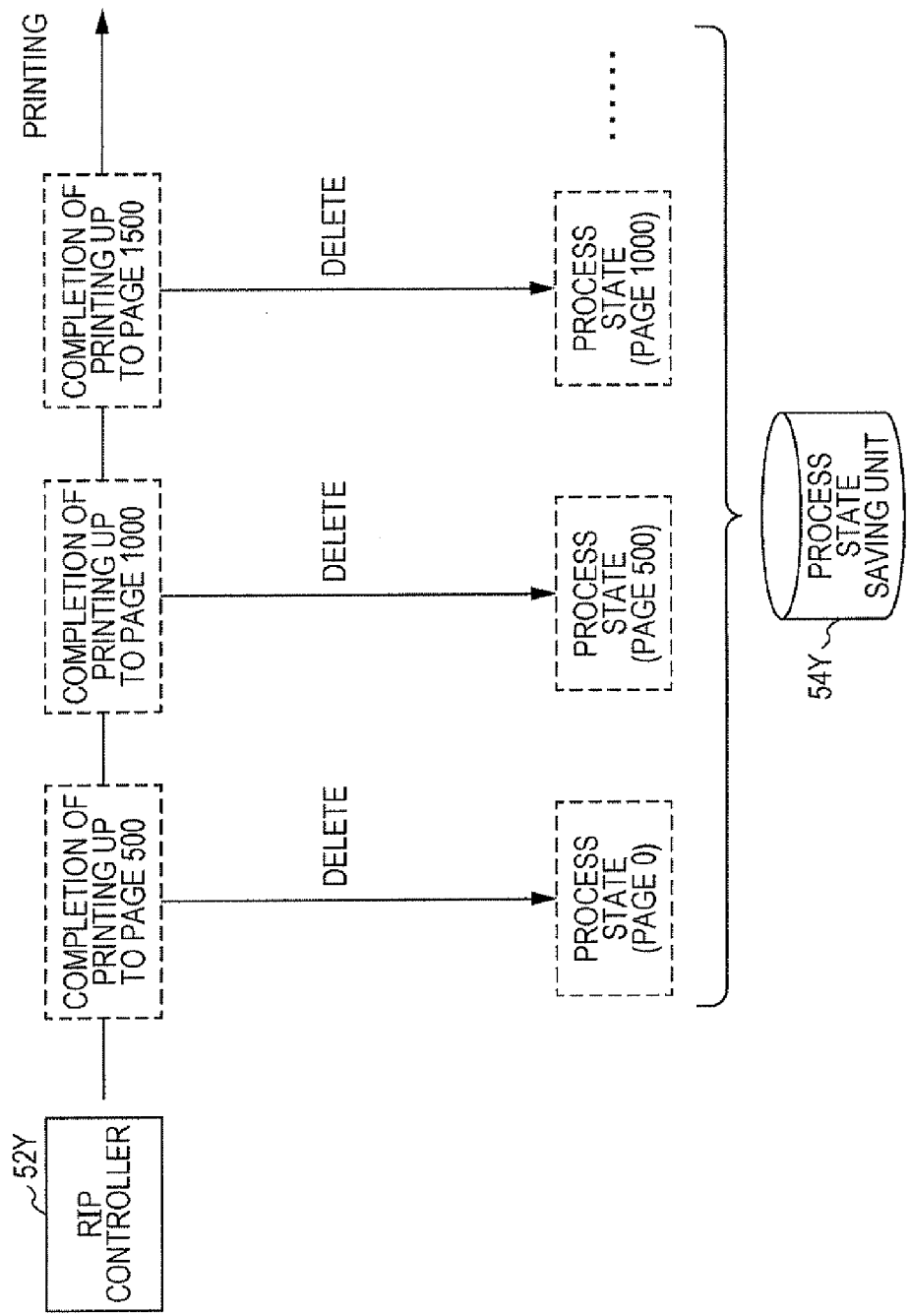

PRINT CONTROL APPARATUS AND IMAGE FORMING SYSTEM FOR RENDERING IMAGE DATA

CROSS-REFERENCE TO RELATED APPLICATIONS

This application is based on and claims priority under 35 USC 119 from Japanese Patent Application No. 2012-020627 filed Feb. 2, 2012.

BACKGROUND

Technical Field

The present invention relates to a print control apparatus, an image forming system, and a non-transitory computer readable medium.

SUMMARY

According to an aspect of the invention, there is provided a print control apparatus including a rendering unit, a sending unit, a distribution unit, and a saving unit. The rendering unit performs rendering in response to a print instruction described in a page-dependent page description language in which details of a change of a print resource on a certain page are applied to other pages. The sending unit sends the entire print instruction including multiple pages to the rendering unit. The distribution unit distributes a process request to the rendering unit. The process request specifies which of the pages included in the print instruction is to be rendered. The saving unit saves a process state of the rendering unit after executing rendering of a preset page. When executing rendering by extracting the print instruction of the page specified by the process request distributed by the distribution unit to image data, if the process request is distributed in descending order in which a page specified by a current process request is prior to a page specified by a previous process request, the rendering unit resumes the process state saved in the saving unit, and performs rendering of the specified page.

BRIEF DESCRIPTION OF THE DRAWINGS

An exemplary embodiment of the present invention will be described in detail based on the following figures, wherein:

FIGS. 6A and 6B are diagrams for describing specific examples of imposition processing when book printing is performed;

FIG. 10 is a diagram for describing the operation of the rendering unit in the case where process request commands are distributed in descending order;

FIG. 11 is a diagram for describing the operation of the rendering unit in the case where process request commands are distributed in ascending order;

FIG. 12 is a diagram for describing operation of the rendering unit in the case where the process request commands are distributed in ascending order; and FIG. 13 is a diagram for describing the operation in which an RIP controller deletes an unnecessary process state from the process state saving unit.

DETAILED DESCRIPTION

Next, an exemplary embodiment of the invention will be described in detail with reference to the drawings.

Figure 1:
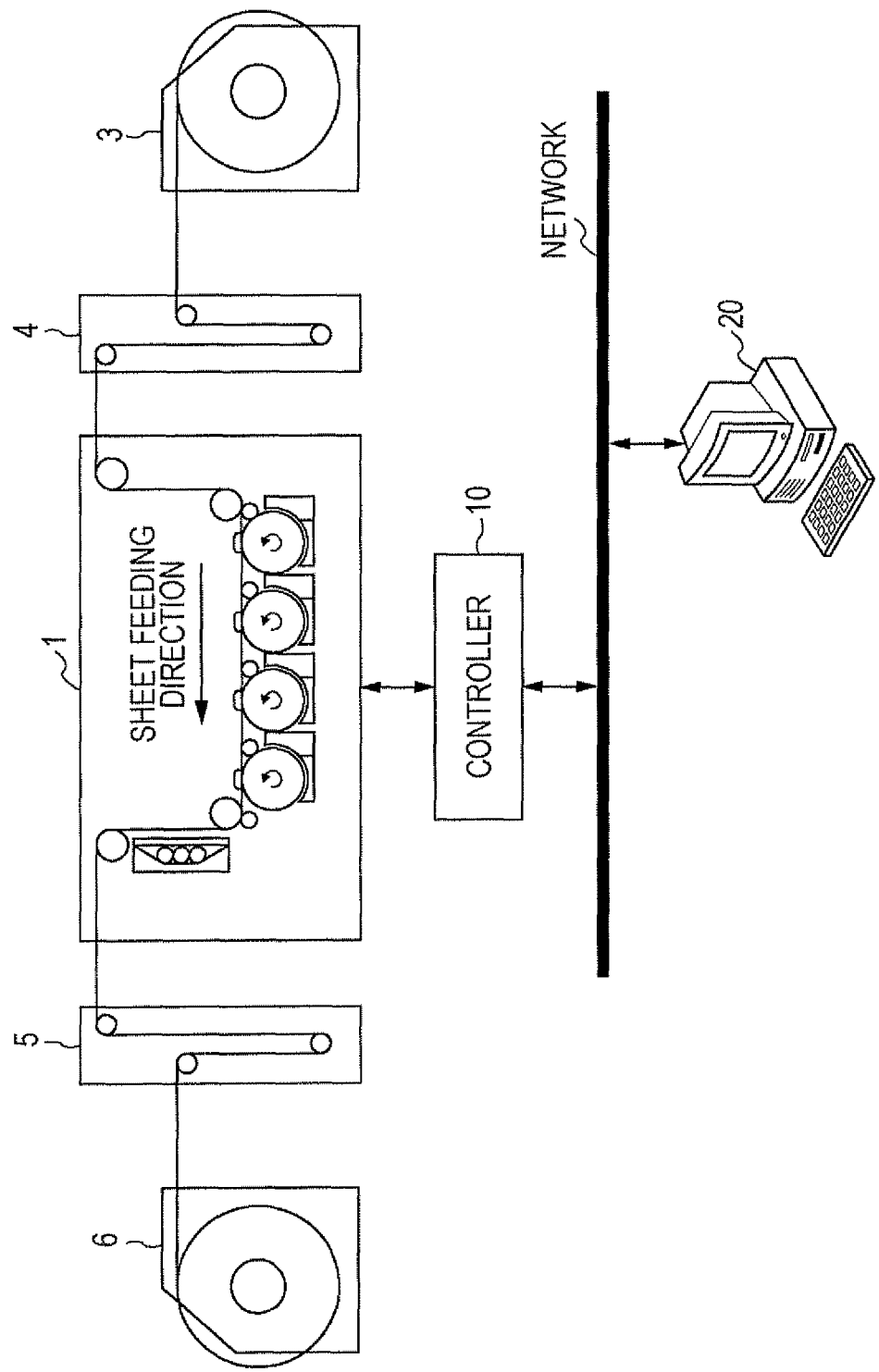
FIG. 1 is a diagram illustrating the system configuration of a print system according to an exemplary embodiment of the invention.

FIG. 1 is a diagram illustrating an example of the configuration of a print system (image forming system) according to an exemplary embodiment of the invention. The print system includes, as illustrated in FIG. 1, a pre-processor 3, a buffer apparatus 4, a printer (image output apparatus) 1 that performs printing on continuous paper, a buffer apparatus 5, a post-processor 6, a controller (print control apparatus) 10, and a terminal apparatus 20.

The pre-processor 3 performs pre-processing such as feeding unprinted print paper. The post-processor 6 performs post-processing such as winding printed print paper. The buffer apparatuses 4 and 5 are provided to maintain, for example, the tension of print paper between the pre-processor 3 and the printer 1 and between the printer 1 and the post-processor 6, respectively.

The terminal apparatus 20 generates print instructions such as print jobs and sends the generated print instructions to the controller 10 via a network. The controller 10 functions as a print control apparatus that controls the print operation of the printer 1 in response to a print instruction sent from the terminal apparatus 20. The printer 1 outputs images on continuous paper in accordance with the print instruction under control of the controller 10.

Figure 2:
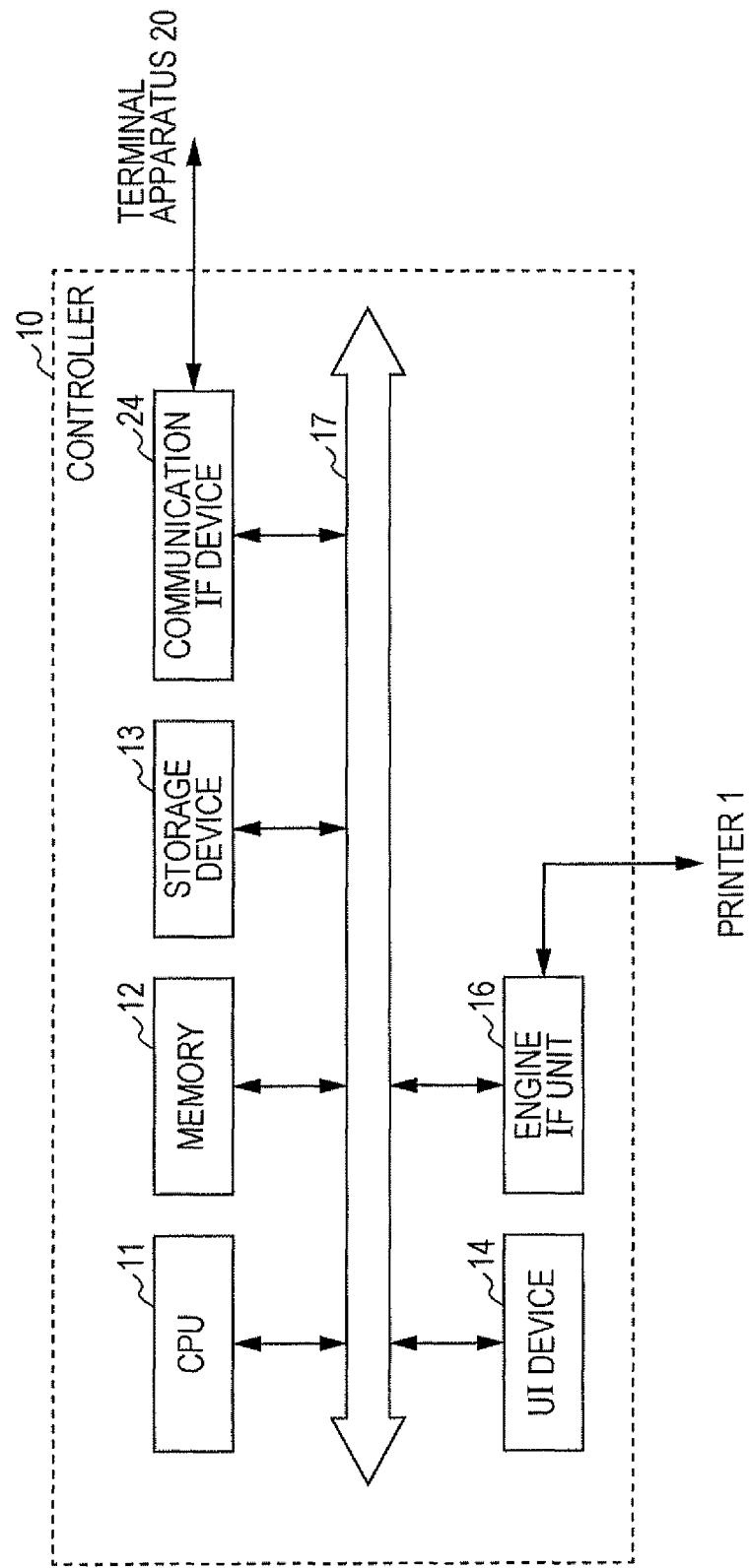
FIG. 2 is a block diagram illustrating the hardware configuration of a controller in the print system according to the exemplary embodiment of the invention.

Next, the hardware configuration of the controller 10 in the print system according to the exemplary embodiment will be described with reference to FIG. 2. The controller 10 of the exemplary embodiment includes, as illustrated in FIG. 2, a central processing unit (CPU) 11, a memory 12, a storage device 13 such as a hard disk drive (HDD), a communication interface (IF) device 24 that sends and receives data to and from the terminal apparatus 20 via a network, a user interface (UI) device 14 that includes a touch panel and a liquid crystal display, and an engine IF device 16 that sends and receives data to and from the printer 1. These elements are interconnected via a control bus 17.

The CPU 11 executes certain processing on the basis of a print control program stored in the memory 12 or the storage device 13 and controls the operation of the controller 10.

Note that, in the exemplary embodiment, it has been described that the CPU 11 reads and executes the control program stored in the memory 12 or the storage device 13. However, the program may be stored in a portable storage medium such as a compact-disc read-only memory (CD-ROM) and provided to the CPU 11.

Figure 3:
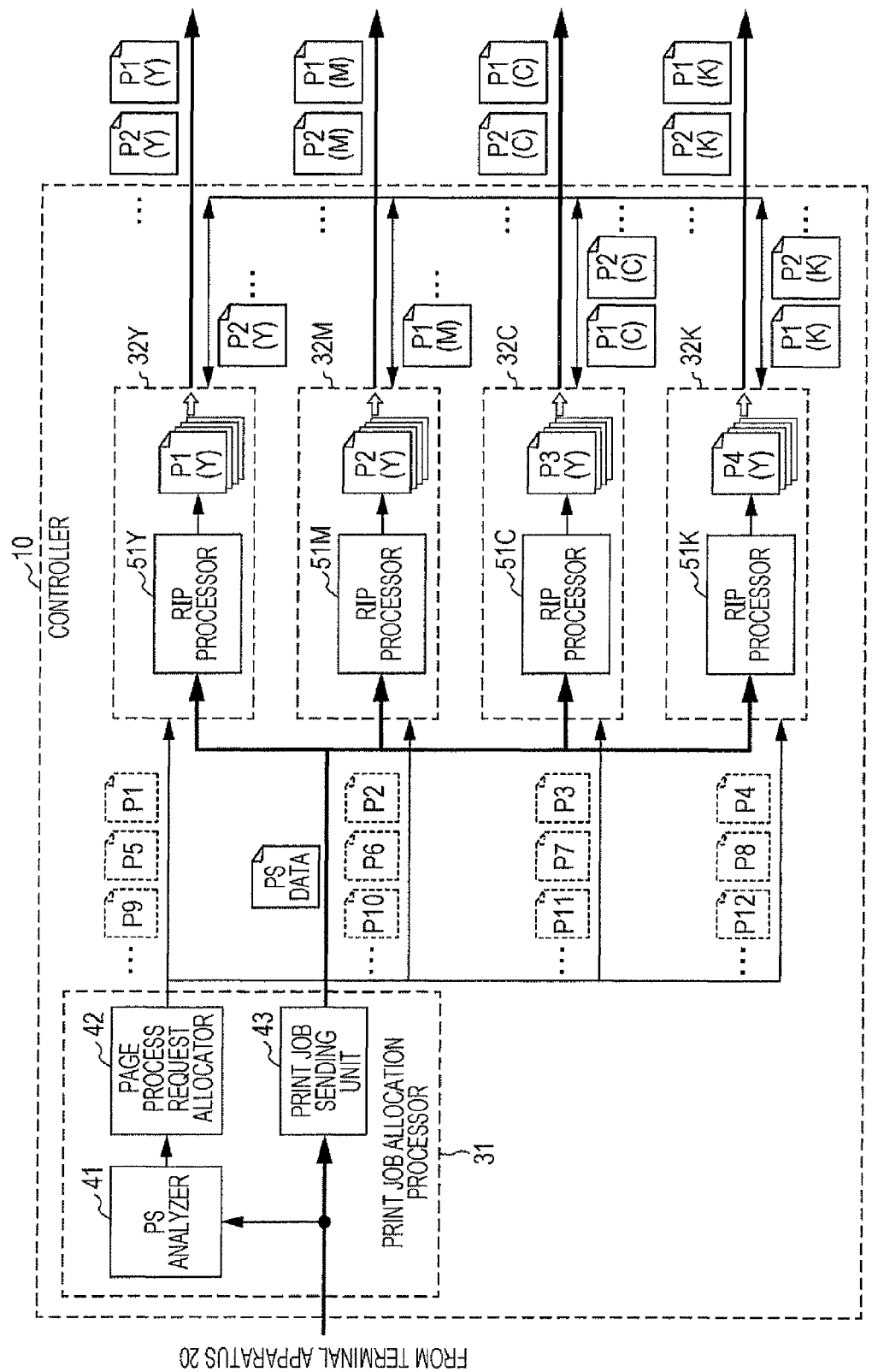
FIG. 3 is a block diagram illustrating the functional configuration of the controller in the print system according to the exemplary embodiment of the invention.

FIG. 3 is a block diagram illustrating the functional configuration of the controller 10 realized by executing the above-described control program.

The controller 10 of the exemplary embodiment includes, as illustrated in FIG. 3, a print job allocation processor 31 and four image processors 32Y to 32K provided for the individual basic colors that the image processors 32Y to 32K are respectively in charge of.

Note that the basic colors are colors that multiple image processors, provided for the individual print basic colors, are in charge of. For example, when the print basic colors are four colors, namely, yellow, magenta, cyan, and black, the basic colors are colors that image processors provided for these individual colors are in charge of.

The print job allocation processor 31 has the function of analyzing a command in a print job (print instruction) sent from the terminal apparatus 20. The print job allocation processor 31 includes a PostScript (PS) analyzer 41, a page process request allocator 42, and a print job sending unit 43.

In many cases, page description languages (PDLS) are used to describe print jobs sent from the terminal apparatus 20.

Page description languages include page-dependent page description languages in which the details of a change of a print resource on a certain page are applied to other pages, and page-independent page description languages in which information necessary for rendering a certain page is collectively described on a page-by-page basis. That is, a print job represented in a page-independent page description language is relatively easily divided in units of pages, whereas a print job represented in a page-dependent page description language is not easily divided in units of pages.

For example, Portable Document Format (PDF) is a page-independent page description language, and PostScript (registered trademark) is a page-dependent page description language.

In the exemplary embodiment, a print job represented in PostScript will be described as an example of a page-dependent print job. However, the exemplary embodiment is similarly applicable to any print job as long as it is represented in a page-dependent page description language.

The print job sending unit 43 sends the entirety of a print job including multiple pages, which has been sent from the terminal apparatus 20, to the four image processors 32Y to 32K before printing starts.

When PostScript data, which is a page-dependent print job, is sent from the terminal apparatus 20, the PS analyzer 41 analyzes commands and analyzes attributes such as the number of pages and the like.

With reference to the analysis results obtained by the PS analyzer 41, the page process request allocator 42 sequentially sends process request commands to the four image processors 32Y to 32K. A process request command specifies which of the pages included in the print job is to be image-processed. Here, the page process request allocator 42 sequentially allocates the process request commands to the image processors 32Y to 32K in a page order specified by the print job.

The image processors 32Y to 32K have raster image processing (RIP) processors 51Y to 51K, respectively, for extracting image data of pages specified by the process request commands, sent from the page process request allocator 42, to print data for the individual colors.

Note that the image processors 32Y to 32K have the transfer function and the output function. The transfer function transfers, of the print data extracted on a color-by-color basis by the RIP processors 51Y to 51K, print data of colors other than the basic colors that the image processors 32Y to 32K are in charge of to image processors of the other colors. The output function outputs the print data of the basic colors that the image processors 32Y to 32K are in charge of, which has been extracted by the RIP processors 51Y to 51K, and the print data of basic colors transferred from the image processors of the other colors.

Note that the controller 10 includes print controllers that control print mechanisms of the individual colors in the printer 1 and output images onto print paper on the basis of print data generated by the image processors 32Y to 32K. However, these print controllers are not illustrated in FIG. 3.

In the example illustrated in FIG. 3, process request commands that specify rendering of image data of page 1 (P1), page 5 (P5), page 9 (P9), . . . are sent to the image processor 32Y.

Similarly, process request commands that specify rendering of image data of page 2 (P2), page 6 (P6), page 10 (P10), . . . are sent to the image processor 32M; process request commands that specify rendering of image data of page 3 (P3), page 7 (P7), page 11 (P11), . . . are sent to the image processor 32C; and process request commands that specify rendering of image data of page 4 (P4), page 8 (P8), page 12 (P12), . . . are sent to the image processor 32K.

In the image processor 32Y, at first, the RIP processor 51Y performs a rasterizing process of extracting, of the entire PostScript data sent from the print job sending unit 43, image data of page 1 to print data for the individual colors. Further, the image processor 32Y transfers, of the rasterized print data, magenta print data P1(M) to the image processor 32M, cyan print data P1(C) to the image processor 32C, and black print data P1(K) to the image processor 32K.

Similarly, in the image processor 32M, at first, the RIP processor 51M performs a rasterizing process of extracting, of the entire PostScript data sent from the print job sending unit 43, image data of page 2 to print data for the individual colors. Further, the image processor 32M transfers, of the rasterized print data, yellow print data P2(Y) to the image processor 32Y, cyan print data P2(C) to the image processor 32C, and black print data P2(K) to the image processor 32K.

In this manner, the image processors 32Y to 32K sequentially perform rasterizing of the individual pages and transfer the obtained print data for the individual colors to the image processors of the corresponding colors. On the basis of the generated print data for the individual colors, the print controllers (not illustrated), provided for the individual colors, control the print mechanisms of the individual colors in the printer 1 and execute outputting to print paper.

Next, the configuration of the RIP processors 51Y to 51K will be described. Although the configuration of the RIP processor 51Y is described with reference to FIG. 4 here, the same or similar applies to the configuration of the RIP processors 51M to 51K.

Figure 4:
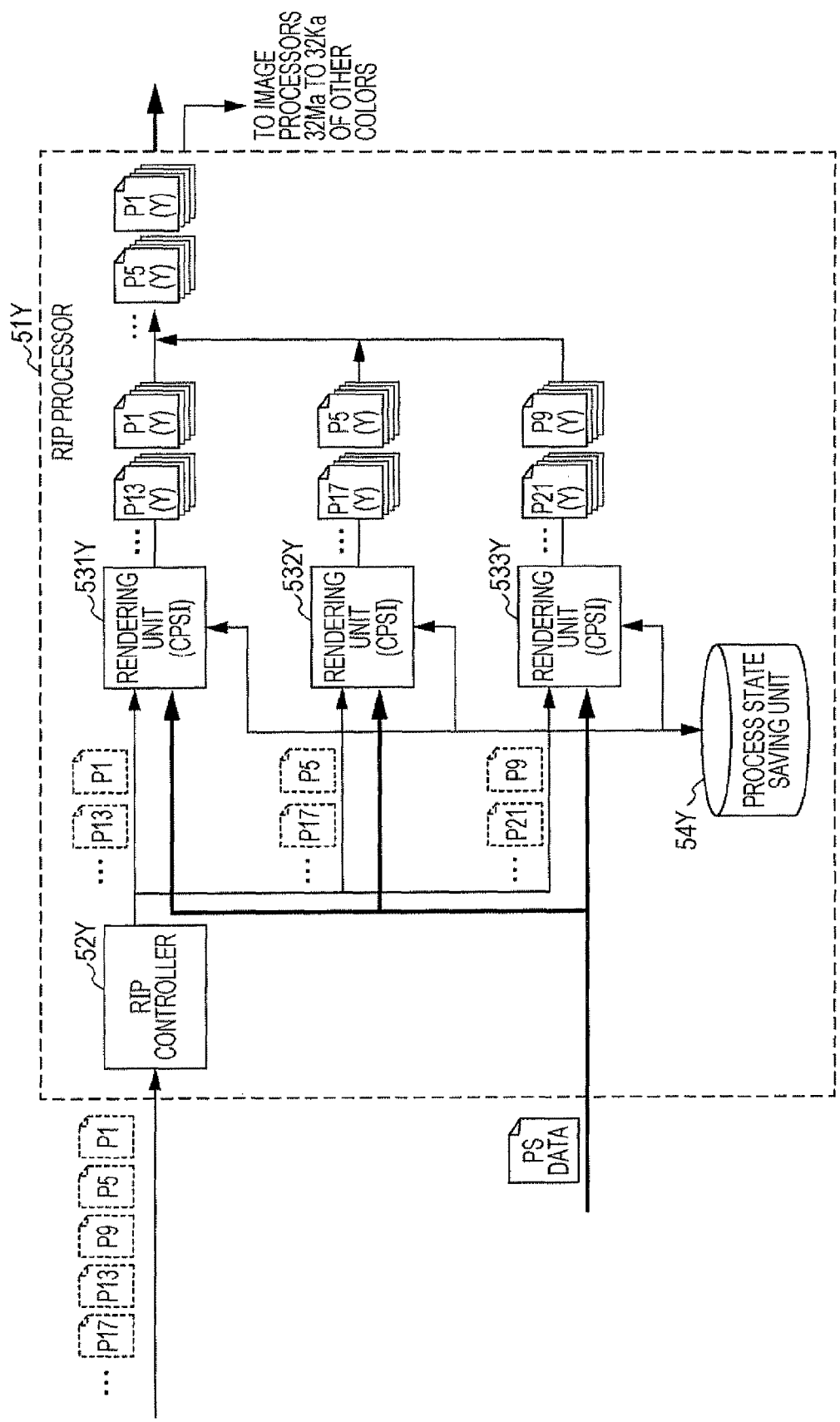
FIG. 4 is a block diagram illustrating the configuration of an RIP processor illustrated in FIG. 3.

The RIP processor 51Y includes, as illustrated in FIG. 4, an RIP controller 52Y, three rendering units 531Y to 533Y, and a process state saving unit 54Y.

The RIP controller 52Y sequentially distributes process request commands, allocated by the page process request allocator 42, to the three rendering units 531Y to 533Y.

The rendering units 531Y to 533Y are realized with software named Configurable PostScript Interpreter (CPSI). The rendering units 531Y to 533Y perform rendering in response to a print job described in PostScript and generate print data in a raster format. The rendering units 531Y to 533Y each have a buffer memory capable of storing print data corresponding to a generated few pages. The rendering units 531Y to 533Y are configured to store the process request commands, distributed from the RIP controller 52Y, in a queue in the distributed order.

When process request commands are distributed from the RIP controller 52Y, the rendering units 531Y to 533Y execute rendering by extracting the print job of a page specified by each of the process request commands distributed from the RIP controller 52Y, and generate print data.

The print mechanism corresponding to the Y color in the printer 1 outputs an image on the basis of print data obtained by rendering performed by the multiple rendering units 531Y to 533Y.

The process state saving unit 54Y saves the process state of the rendering units 531Y to 533Y after rendering of a preset page is executed.

Specifically, the process state saving unit 54Y saves the process state (data of the process state) of the rendering units 531Y to 533Y after rendering at intervals of preset pages, such as at intervals of 500 pages, is executed. Here, saving the process state at intervals of 500 pages refers to saving the process state of the rendering units 531Y to 533Y after rendering of each of the pages including page 500, page 1000, page 1500, . . . is executed. Alternatively, page 0 may be included in the pages where the process state is to be saved; and the process state of the rendering units 531Y to 533Y after rendering of page 0 is executed may be saved in the process state saving unit 54Y. Here, after rendering of page 0 is executed refers to a state before rendering of page 1 is executed.

When the process state of rendering is to be saved in the process state saving unit 54Y, a fork command that is a command for copying the process state is used. For example, when the process state of rendering page 500 is to be saved, after the rendering units 531Y to 533Y perform rendering of page 500, the entire rendering process is copied using the fork command, and the copied rendering process is saved in the process state saving unit 54Y. At this time, the resources after rendering page 500, the memory space in a rendering environment, and the state of each communication port, file descriptor, and the like are also copied. In the memory space used in the copied process, a region such as a raster buffer region that is not directly related to RIP is released to reduce the memory size, and the copied process state is saved.

In the copied process state, temporary files whose write attribute is open are all closed and copied to a save region, and the file open attribute and offset value up to that time are also saved. Already closed temporary files are also copied to the save region. Because the permanent resources of a read system are to be used in a shared manner, these permanent resources are not copied. Further, communication ports for reporting print instructions and results are closed and caused to enter a connection wait state so that communication is resumable after processing starts again.

When executing rendering by extracting a print instruction of a page specified by a corresponding one of the process request commands, distributed from the RIP controller 52Y, to image data, the rendering units 531Y to 533Y each resume the process state saved in the process state saving unit 54Y, which corresponds to rendering of the greatest page not exceeding the page specified by the distributed process request command, and perform rendering of the specified page.

To resume the saved process state, files saved in the save region are copied to individual RIP work regions, and the files with the saved attributes are opened and offset translated to recover file descriptors. Also, each communication port is reconnected, and the rendering units 531Y to 533Y enter an instruction wait state.

Note that, in the rendering units 531Y to 533Y, the permanent file resources at the time of copying the process state are checked and compared with those at the time the print instruction is started. If there is any difference, the difference is saved. An error is reported when reference is made to different file resources during RIP processing after rendering is resumed.

Note that the operation in which the rendering units 531Y to 533Y resume the process state saved in the process state saving unit 54Y and execute processing, starting from rendering the pages halfway, will be described later in detail.

At first, the reason the process state of the rendering units 531Y to 533Y after processing a specific page is saved in the process state saving unit 54Y will be described below.

As described above, PostScript is a page-dependent page description language. Therefore, print resources such as a font and form set on a certain page are effective on other pages.

For example, referring to FIG. 5, the case in which the setting of a print resource (OOO) is set to "A" on page 1 and is changed to "B" on page 3 will be described.

Figure 5:
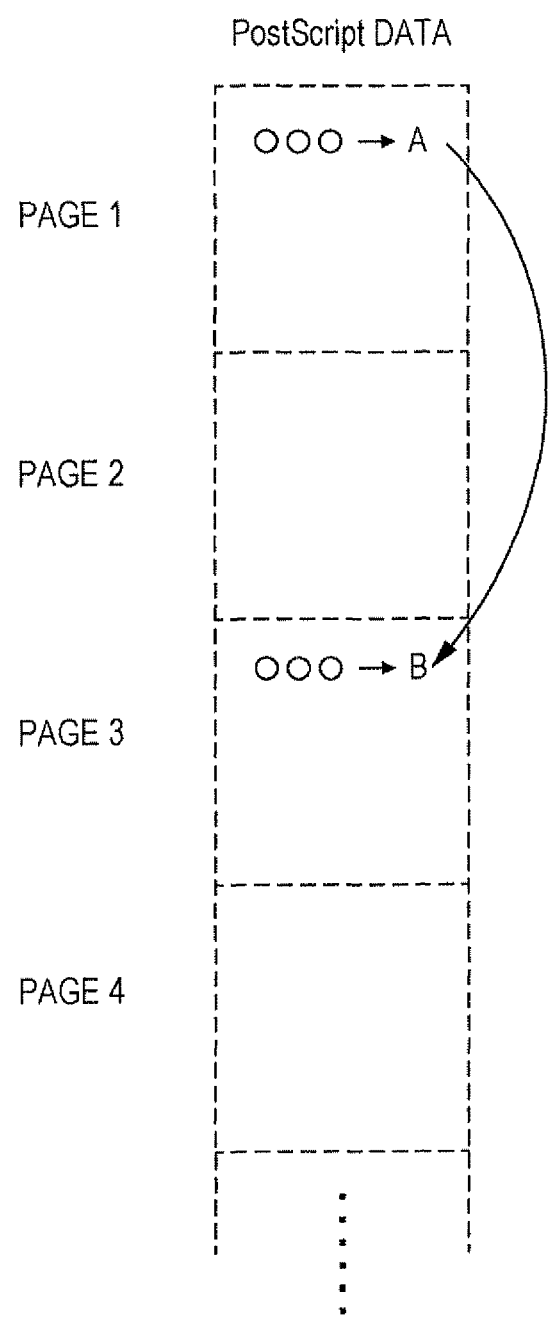
FIG. 5 is a diagram for describing the structure of PostScript data.

In a case such as that illustrated in FIG. 5, when rendering of page 4 is to be performed using this print resource, if a command on page 3 is not executed, rendering of page 4 is not normally performed. Thus, it is necessary to execute commands on the first to third pages when rendering of a print job of page 4 is to be performed.

That is, when the RIP controller 52Y distributes process request commands in a page ascending order to the rendering units 531Y to 533Y, no particular problem occurs when the rendering units 531Y to 533Y perform rendering of pages specified by the process request commands.

Here, distribution in a page ascending order refers to distribution of process request commands in which a page specified by a process request command distributed the next time is subsequent to a page specified by a process request command distributed the previous time. In other words, when a process request command specifying rendering of page 3 and then a process request command specifying rendering of page 4 are distributed, the process request commands are distributed in ascending order.

When rendering of a print job of page 2 is to be performed after rending of the print job of page 4 is finished, since the setting of the print resource (OOO) has already been set to "B", normal rendering is unexecutable when rendering of the print job of page 2 is performed as it is.

Thus, when process request commands are distributed in descending order in which a page specified by the current process request command is prior to a page specified by the previous process request command, the rendering units 531Y to 533Y re-execute processing of the sent print job from the first page.

Specifically, when rendering of page 2, which is prior to page 4, is specified by a process request command after rendering of page 4 is specified by a process request command, the rendering units 531Y to 533Y re-execute processing of the sent print job from page 1, which is the first page.

In fact, when the RIP controller 52Y distributes process request commands in descending order to the rendering units 531Y to 533Y, the rendering units 531Y to 533Y are restarted and controlled to execute the print job from the first page.

Here, as illustrated in FIGS. 3 and 4, when the order of output pages specified by the print job continuously increases, the RIP controller 52Y sequentially allocates and distributes the sent process request commands to the rendering units 531Y to 533Y. In this way, the process request commands are distributed in ascending order to all the rendering units 531Y to 533Y.

For example, the RIP controller 52Y distributes, in order, the distributed process request commands to the rendering units 531Y to 533Y, or simply selects a rendering unit for which there is no process request command to be processed, and distribute a process request command to the selected rendering unit.

However, when printing such as book printing or printing of selected pages is to be performed, the order of output pages is not necessarily the order from page 1. For example, in book printing, pages are arranged in order of appearance of bound pages. Therefore, pages are scattered and specified, as in page 1, page 100, page 99, . . . , and printing is performed.

For example, FIGS. 6A and 6B illustrate specific examples. FIG. 6A is a diagram illustrating the order of output pages in the case where four pages are imposed on one sheet. FIG. 6B is a diagram illustrating the order of output pages in the case where 16 pages are saddle-stitched.

Figure 7:
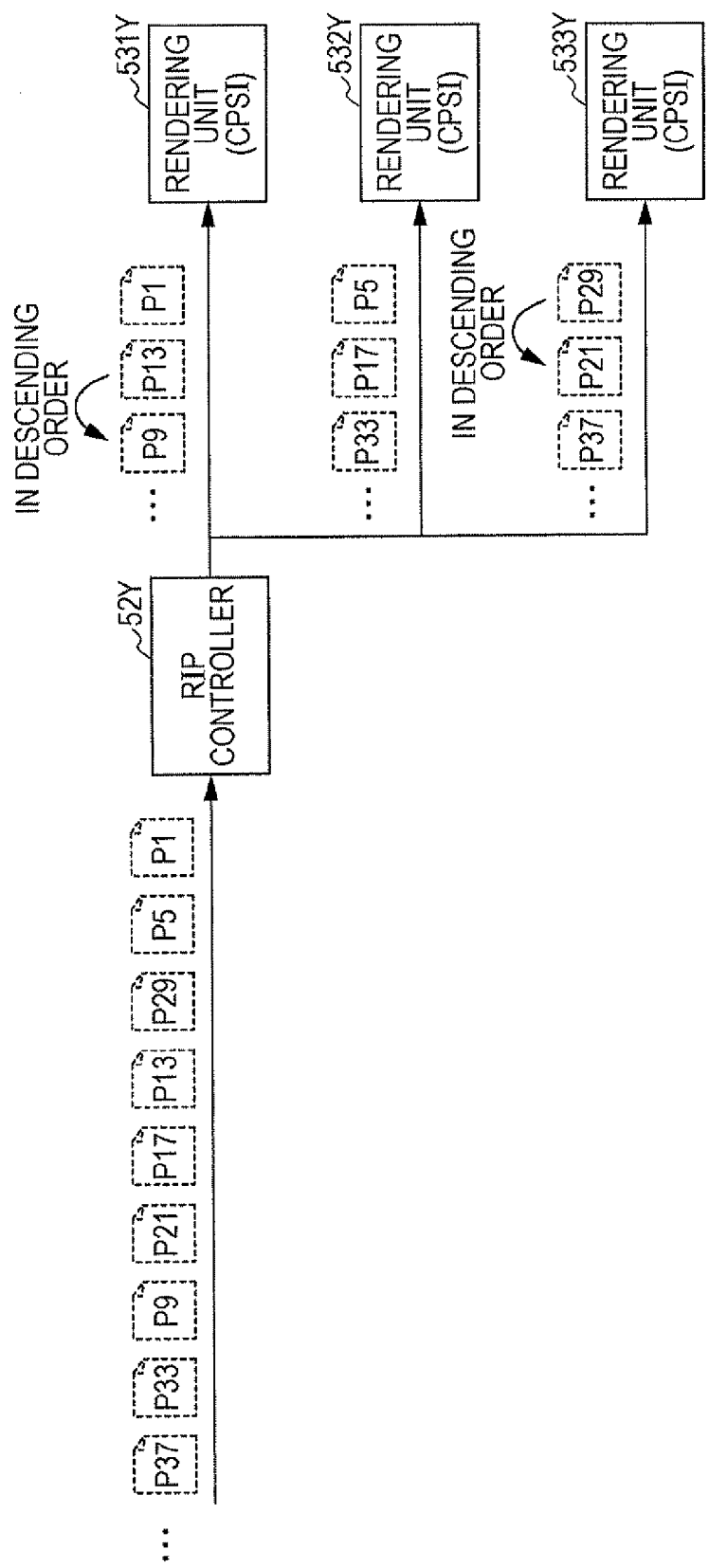
FIG. 7 is a diagram illustrating the manner in the case where, when a print job including pages that are not in consecutive order is to be executed, process request commands are distributed to rendering units.

FIG. 7 illustrates the manner in which, when a print job in which the order of pages is not consecutive is to be executed, process request commands for specifying pages to be processed are sequentially distributed to the three rendering units 531Y to 533Y.

In FIG. 7, output pages are specified as: P1, P5, P29, P13, P17, . . . . Thus, the rendering units 531Y to 533Y are also respectively specified to process inconsecutive pages. For example, process request commands in the order of P1, P13, P9, . . . are sent to the rendering unit 531Y.

When rendering of P9 is to be performed after rendering of P13 is executed, because of the reason described above, the rendering unit 531Y is necessary to be restarted and re-execute rendering from the beginning of the print job to page 8.

Also, with regard to the rendering unit 533Y, since process request commands are sent in descending order, such as P29, P21, . . . , to the rendering unit 533Y, the rendering unit 533Y is similarly necessary to be restarted and re-execute rendering from the beginning of the print job to page 20.

When process request commands are distributed in descending order, if rendering from the beginning of the print job to a specified page is executed, there is no advantage in performing parallel processing using the three rendering units 531Y to 533Y.

Therefore, when process request commands are distributed in descending order in which a page specified by the current process request command is prior to a page specified by the previous process request command, the rendering units 531Y to 533Y each resume the process state saved in the process state saving unit 54Y and execute rendering of a page specified by a corresponding one of the distributed process request commands.

Also, even when process request commands are sent in ascending order in which a page specified by the current process request command is subsequent to a page specified by the previous process request command, if a process state corresponding to rendering of the greatest page not exceeding a page specified by a corresponding one of the distributed process request commands is saved in the process state saving unit 54Y, the rendering units 531Y to 533Y may each resume the process state corresponding to rendering of that page and execute rendering of the page specified by the distributed process request command.

Note that the process state saving unit 54Y is provided in a shared manner among the three rendering units 531Y to 533Y. Therefore, the process state saving unit 54Y saves the process state of one of three rendering units 531Y to 533Y that first performs rendering of a preset page as a process state corresponding to rendering of that page.

Figure 8:
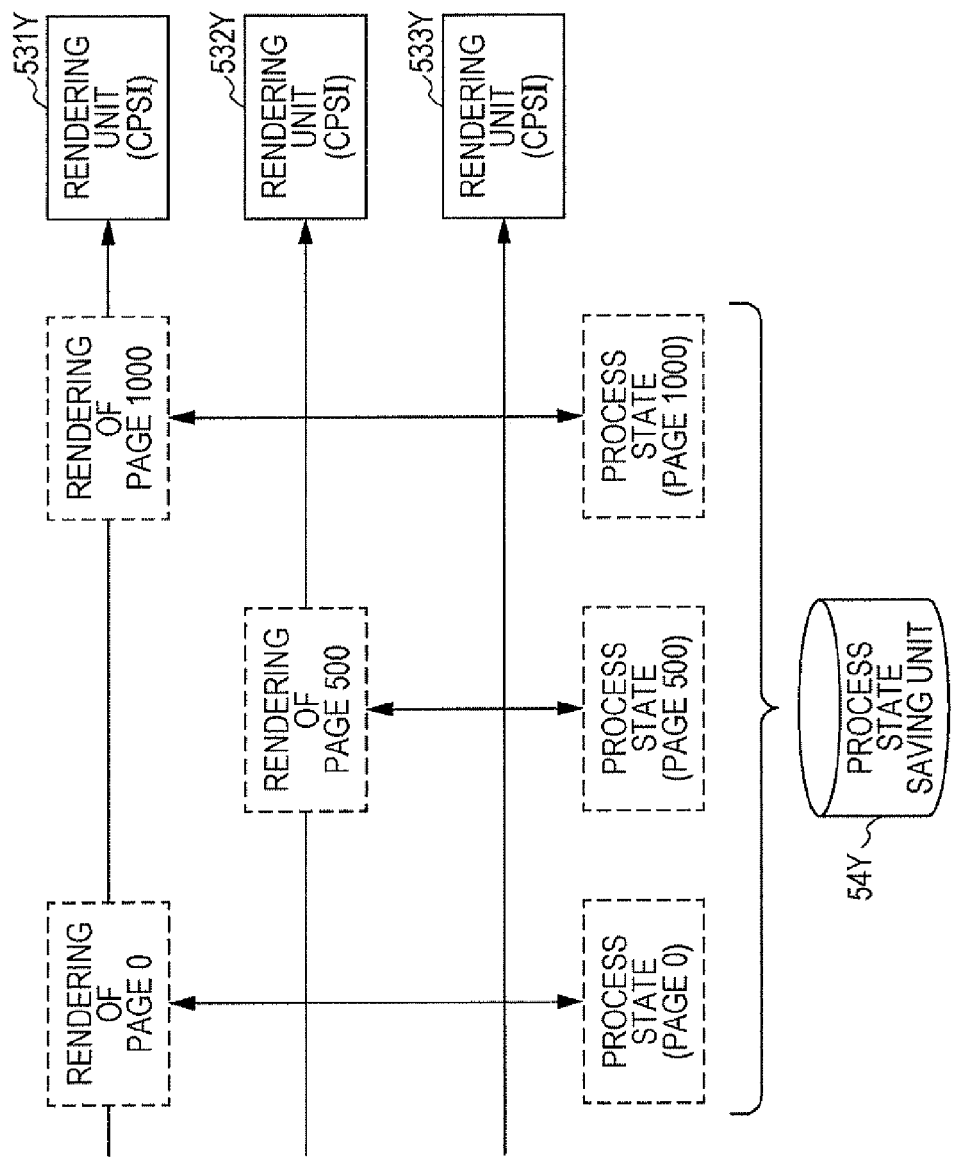
FIG. 8 is a diagram for describing the operation in which a process state saving unit saves the process state of the rendering units.

For example, as illustrated in FIG. 8, when the three rendering units 531Y to 533Y perform, in parallel, rendering of pages specified by process request commands, if the rendering unit 531Y first performs rendering of page 0, the process state saving unit 54Y saves the process state of the rendering unit 531Y as the process state of page 0. Similarly, when the rendering unit 532Y first performs rendering of page 500, the process state saving unit 54Y saves the process state of the rendering unit 532Y as the process state of page 500. When the rendering unit 531Y first performs rendering of page 1000, the process state saving unit 54Y saves the process state of the rendering unit 531Y as the process state of page 1000.

Note that, as illustrated in FIG. 8, the process state corresponding to rendering of page 0 is saved in the process state saving unit 54Y because, by resuming the process state corresponding to rendering of page 0, initialization processing may be omitted in the rendering units 531Y to 533Y.

Next, the operation of the RIP processor 51Y of the exemplary embodiment will be described with reference to the drawings.

In order to simplify the following description, the case in which rendering is performed in parallel by the two rendering units 531Y and 532Y will be described. Also, it is assumed that the process state saving unit 54Y saves the process state of rendering at intervals of 500 pages, including the process state of page 0.

Figure 9:
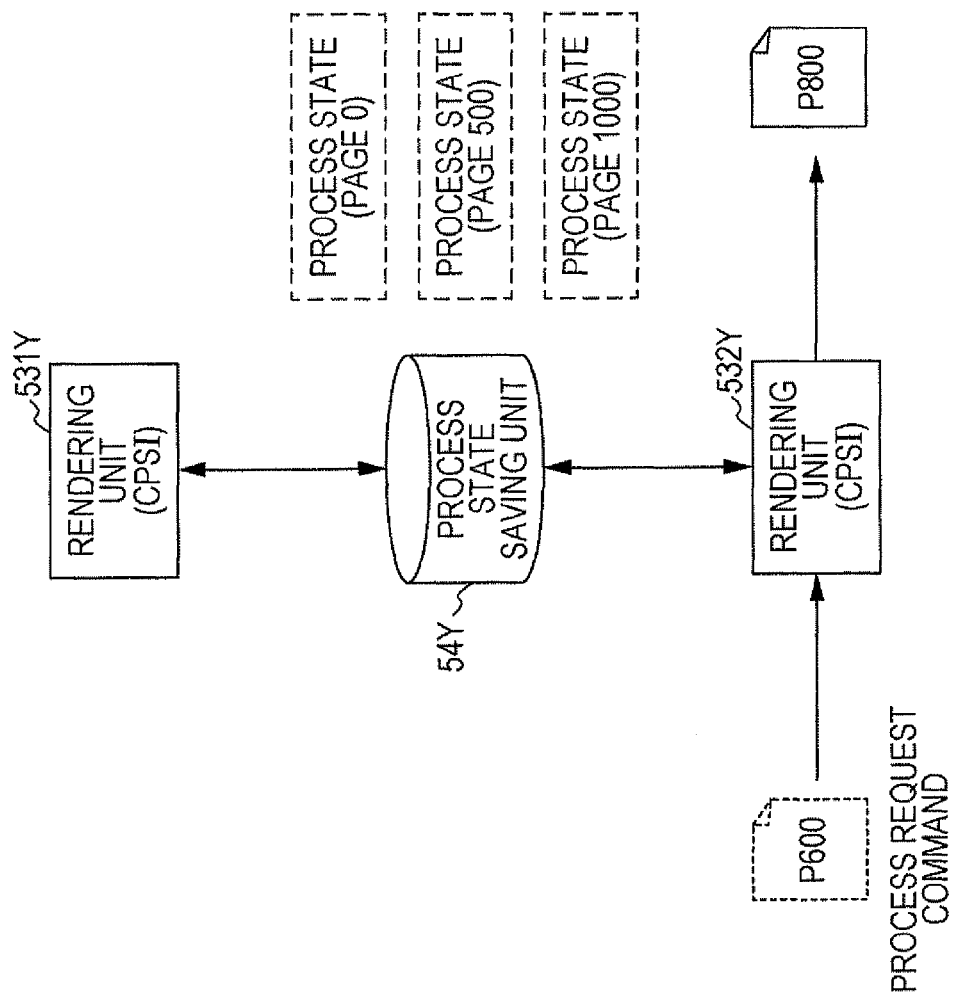
FIG. 9 is a diagram for describing the operation of one of the rendering units in the case where process request commands are distributed in descending order.

For example, referring to FIG. 9, the case in which the process state of page 0, page 500, and page 1000 is saved in the process state saving unit 54Y will be described.

In such a case, it is assumed that, after a process request command specifying rendering of page 800 is distributed to the rendering unit 532Y, a process request command specifying rendering of page 600, which is in descending order, is distributed to the rendering unit 532Y.

As illustrated in FIG. 10, when executing rendering of page 600 specified by the process request command, the rendering unit 532Y resumes the process state saved in the process state saving unit 54Y, which corresponds to rendering of the greatest page not exceeding page 600 specified by the process request command, that is, page 500, executes processing, starting from rendering page 501, and performs rendering of the specified page 600.

With such processing being performed, in the rendering unit 532Y, the time until rendering of the page specified by the process request command is executed is reduced, compared with the case in which initialization is performed, rendering of the first page to page 599 is performed, and then rendering of page 600 is performed.

Next, referring to FIG. 11, the operation in the case where a process request command specifying rendering of page 120 and then a process request command specifying rendering of page 1100 are distributed to the rendering unit 532Y will be described.

In this case, the process request commands are distributed to the rendering unit 532Y in ascending order. Thus, the rendering unit 532Y simply executes rendering of the specified page 1100 after executing rendering of page 121 to page 1099, without executing rendering from the first page.

However, the process state corresponding to rendering of page 1000 is saved in the process state saving unit 54Y. Therefore, as illustrated in FIG. 12, when executing rendering of page 1100 specified by the process request command, the rendering unit 532Y resumes the process state saved in the process state saving unit 54Y, which corresponds to rendering of the greatest page not exceeding page 1100, that is, page 1000, thereby executing processing, starting from rendering page 1001, and performing rendering of the specified page 1100.

With such processing being performed, in the rendering unit 532Y, the time until rendering of the page specified by the process request command is executed is reduced, compared with the case in which rendering of page 1100 is performed after rendering from page 121 to page 1099 is performed.

Note that the RIP controller 52Y may function as a deletion unit that monitors information of a page whose printing has been normally finished, and deletes, from the process state saving unit 54Y, a process state that becomes unnecessary in subsequent rendering.

For example, referring to FIG. 13, the case in which the process state is saved at intervals of 500 pages, as in page 0, page 500, page 1000, page 1500, . . . , in the process state saving unit 54Y will be specifically described.

In such a case, the RIP controller 52Y monitors information of a page whose printing has been normally finished. When the RIP controller 52Y confirms that printing of all the pages up to page 500 has been completed, the RIP controller 52Y deletes the process state corresponding to rendering of page 0 from the process state saving unit 54Y. Further, when the RIP controller 52Y confirms that printing of all the pages up to page 1000 has been completed, the RIP controller 52Y deletes the process state corresponding to rendering of page 500 from the process state saving unit 54Y. Also, when the RIP controller 52Y confirms that printing of all the pages up to page 1500 has been completed, the RIP controller 52Y deletes the process state corresponding to rendering of page 1000 from the process state saving unit 54Y.

[Modification]

In the above-described exemplary embodiment, the case in which a process state is copied using a fork command and is stored has been used. However, the exemplary embodiment is not limited to such a method. The exemplary embodiment is applicable to the case in which resources such as the memory space are shared, and the state of rendering is saved as a thread. When the state of rendering is saved as a thread, exclusive control is necessary that prevents the multiple rendering units 531Y to 533Y from simultaneously accessing the memory.

In the above-described exemplary embodiment, the case in which rendering is performed in parallel by using the multiple rendering units 531Y to 533Y has been described. However, the exemplary embodiment is similarly applicable to the case in which rendering of a print instruction is performed by using a single rendering unit.

In the above-described exemplary embodiment, the print job sending unit 43 sends the entire print job to the image processors 32Y to 32K. However, the exemplary embodiment is not limited to such a configuration. The exemplary embodiment is applicable to the case in which the entire print job including multiple pages is stored in a storage unit, and, instead of sending the entire print job from the print job sending unit 43 to the image processors 32Y to 32K, reference data for accessing the print job stored in the storage unit is sent.

In such a configuration, in the RIP processor 51Y, the RIP controller 52Y distributes reference data, together with process request commands, to the rendering units 531Y to 533Y. The rendering units 531Y to 533Y each access the print job stored in the storage unit on the basis of the reference data distributed from the RIP controller 52Y, and execute rendering by extracting the print job of a page specified by a corresponding one of the distributed process request commands to image data.

Further, in the above-described exemplary embodiment, the case in which a print job described in PostScript, which is a page-dependent page description language, is executed has been described. However, the exemplary embodiment is not limited to this case. The exemplary embodiment is similarly applicable to the case in which a print job described in PDF, which is a page-independent page description language in which the details of a change regarding print settings on a certain page are not applied to other pages. In this case, a converter for converting PDF data to PostScript data may only necessary to be provided in the print job allocation processor 31 or all of the image processors 32Y to 32K. The print job sending unit 43 may only need to send the PostScript data, obtained by conversion performed by the converter, to the image processors 32Y to 32K.

With such a configuration, even when rendering of PDF data is performed using the Configurable PostScript Interpreter (CPSI) of the related art without using a rendering system of directly performing rendering of PDF without converting PDF to PostScript, parallel processing in units of pages is executed by multiple rendering units.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A print control apparatus comprising a processor, the processor adapted to function as:
   a rendering unit that performs rendering in response to a print instruction described in a page-dependent page description language in which details of a change of a print resource on a certain page are applied to other pages;
   a sending unit that sends the entire print instruction including a plurality of pages to the rendering unit;
   a distribution unit that distributes a process request to the rendering unit, the process request specifying which of the pages included in the print instruction is to be rendered; and
   a saving unit that saves a process state of the rendering unit after executing rendering of a preset page,
   wherein, when executing rendering by extracting the print instruction of the page specified by the process request distributed by the distribution unit to image data, when the process request is distributed in descending order in which a page specified by a current process request is prior to a page specified by a previous process request, the rendering unit resumes the process state saved in the saving unit, and performs rendering of the specified page.

2. The print control apparatus according to claim 1, further comprising a deletion unit that monitors information of a page whose printing has been normally finished and deletes, from the saving unit, a process state that becomes unnecessary in subsequent rendering.

3. A print control apparatus comprising a processor, the processor adapted to function as:
a plurality of rendering units that perform rendering in response to a print instruction described in a page-dependent page description language in which details of a change of a print resource on a certain page are applied to other pages;
a sending unit that sends the entire print instruction including a plurality of pages to the plurality of rendering units;
a distribution unit that sequentially distributes process requests to the plurality of rendering units, each of the process requests specifying which of the pages included in the print instruction is to be rendered; and
a saving unit that saves a process state of one of the plurality of rendering units after executing rendering of a preset page,
wherein, when executing rendering by extracting the print instruction of a page specified by a corresponding one of the process requests distributed by the distribution unit to image data, when the process requests are distributed in descending order in which a page specified by a current process request is prior to a page specified by a previous process request, the plurality of rendering units each resume the process state saved in the saving unit, and perform rendering of the specified page.

4. The print control apparatus according to claim 3, wherein the saving unit saves the process state of the rendering unit after executing rendering at intervals of preset pages.

5. The print control apparatus according to claim 3, wherein the saving unit saves the process state of one of the plurality of rendering units that first performs rendering of the preset page as a process state corresponding to rendering of that page.

6. The print control apparatus according to claim 3, wherein, even when the process requests are distributed in ascending order in which the page specified by the current process request is subsequent to the page specified by the previous process request, when a process state corresponding to rendering of a greatest page not exceeding the page specified by the corresponding one of the distributed process requests is saved in the saving unit, the plurality of rendering units each resume the process state corresponding to rendering of that page and execute rendering of the page specified by the distributed process request.

7. The print control apparatus according to claim 3, further comprising a deletion unit that monitors information of a page whose printing has been normally finished and deletes, from the saving unit, a process state that becomes unnecessary in subsequent rendering.

8. A print control apparatus comprising a processor, the processor adapted to function as:
a plurality of rendering units that perform rendering in response to a print instruction described in a page-dependent page description language in which details of a change of a print resource on a certain page are applied to other pages;
a storage unit that stores the entire print instruction including a plurality of pages;
a distribution unit that sequentially distributes process requests and reference information to the plurality of rendering units, each of the process requests specifying which of the pages included in the print instruction is to be rendered, the reference information being for accessing the print instruction stored in the storage unit; and
a saving unit that saves a process state of one of the plurality of rendering units after executing rendering of a preset page,
wherein, when accessing the print instruction stored in the storage unit based on the reference information distributed by the distribution unit and executing rendering by extracting the print instruction of a page specified by a corresponding one of the process requests distributed by the distribution unit to image data, when the process requests are distributed in descending order in which a page specified by a current process request is prior to a page specified by a previous process request, the plurality of rendering units each resume the process state saved in the saving unit, and perform rendering of the specified page.

9. The print control apparatus according to claim 8, wherein the saving unit saves the process state of the rendering unit after executing rendering at intervals of preset pages.

10. The print control apparatus according to claim 8, wherein the saving unit saves the process state of one of the plurality of rendering units that first performs rendering of the preset page as a process state corresponding to rendering of that page.

11. The print control apparatus according to claim 8, wherein, even when the process requests are distributed in ascending order in which the page specified by the current process request is subsequent to the page specified by the previous process request, when a process state corresponding to rendering of a greatest page not exceeding the page specified by the corresponding one of the distributed process requests is saved in the saving unit, the plurality of rendering units each resume the process state corresponding to rendering of that page and execute rendering of the page specified by the distributed process request.

12. The print control apparatus according to claim 8, further comprising a deletion unit that monitors information of a page whose printing has been normally finished and deletes, from the saving unit, a process state that becomes unnecessary in subsequent rendering.

13. An image forming system comprising a processor, the processor adapted to function as:
a plurality of rendering units that perform rendering in response to a print instruction described in a page-dependent page description language in which details of a change of a print resource on a certain page are applied to other pages;
a sending unit that sends the entire print instruction including a plurality of pages to the plurality of rendering units;
a distribution unit that sequentially distributes process requests to the plurality of rendering units, each of the process requests specifying which of the pages included in the print instruction is to be rendered;
a saving unit that saves a process state of one of the plurality of rendering units after executing rendering of a preset page; and
an output unit that outputs an image based on image data obtained as a result of performing rendering by the plurality of rendering units,
wherein, when executing rendering by extracting the print instruction of a page specified by a corresponding one of the process requests distributed by the distribution unit to image data, when the process requests are distributed in descending order in which a page specified by a current process request is prior to a page specified by a previous process request, the plurality of rendering units each resume the process state saved in the saving unit, and perform rendering of the specified page.

14. A non-transitory computer readable medium storing a program causing a computer to execute a process, the process comprising:

sending the entirety of a print instruction including a plurality of pages to a plurality of rendering units that perform rendering in response to the print instruction described in a page-dependent page description language in which details of a change of a print resource on a certain page are applied to other pages;

sequentially distributing process requests to the plurality of rendering units, each of the process requests specifying which of the pages included in the print instruction is to be rendered;

executing, by each of the plurality of rendering units, rendering by extracting the print instruction of a page specified by a corresponding one of the distributed process requests to image data;

saving a process state of one of the plurality of rendering units after executing rendering of a preset page;

when executing rendering by extracting the print instruction of a page specified by a corresponding one of the distributed process requests to image data, when the process requests are distributed in descending order in which a page specified by a current process request is prior to a page specified by a previous process request, resuming the process state saved in the saving unit, and performing rendering of the specified page; and outputting an image based on image data obtained as a result of performing rendering by the plurality of rendering units.

* * * * *